US009763536B1

United States Patent
Lefkovitz

(10) Patent No.: US 9,763,536 B1
(45) Date of Patent: Sep. 19, 2017

(54) ESSENCE EXTRACTOR

(76) Inventor: Joshua A. Lefkovitz, Chicago, IL (US)

( * ) Notice: Subject to any disclaimer, the term of this patent is extended or adjusted under 35 U.S.C. 154(b) by 778 days.

(21) Appl. No.: 13/606,224

(22) Filed: Sep. 7, 2012

Related U.S. Application Data

(63) Continuation-in-part of application No. 12/961,828, filed on Dec. 7, 2010, now Pat. No. 8,613,402.

(51) Int. Cl.
*A47J 31/44* (2006.01)

(52) U.S. Cl.
CPC ..................... *A47J 31/44* (2013.01)

(58) Field of Classification Search
CPC ........................................ A47J 31/44
USPC ..................... 241/21, 101.8, 169.2
See application file for complete search history.

(56) References Cited

U.S. PATENT DOCUMENTS 8,613,402 B2 * 12/2013 Lefkovitz ................. 241/30
2011/0042497 A1 * 2/2011 Silvers et al. ............. 241/101.8

* cited by examiner

*Primary Examiner* — Mark Rosenbaum
(74) *Attorney, Agent, or Firm* — John D. Gugliotta

(57) ABSTRACT

An improved portable essence extractor and liquid container combination is provided in which an essence extractor having a muddling assembly that is removably connected to, and in continuous fluid communication with, a liquid dispensing container. The essence extractor and muddling assembly comprises a handle and a muddling mechanism. The muddling assembly is designed to act as a lid or be incorporated into the lid of the container providing a leak proof and compact container. The muddling assembly further has a separating mechanism limiting the intrusion of pulp or solids into the user's drink. The muddling assembly further provides for extension or retraction with a mechanical linearly adjustment mechanism. The muddling assembly therein forms the lid or is integrated with a lid of the container.

20 Claims, 4 Drawing Sheets

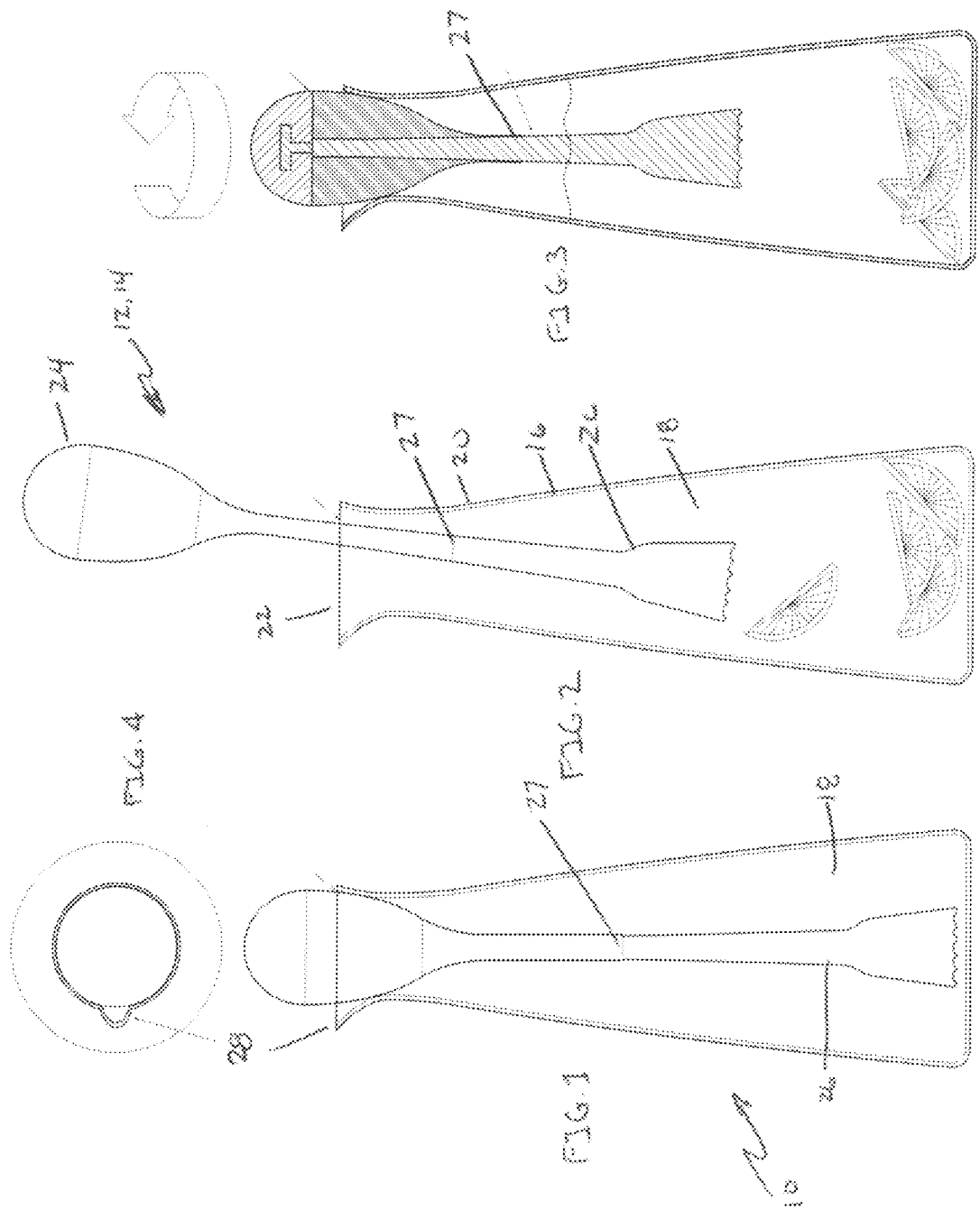

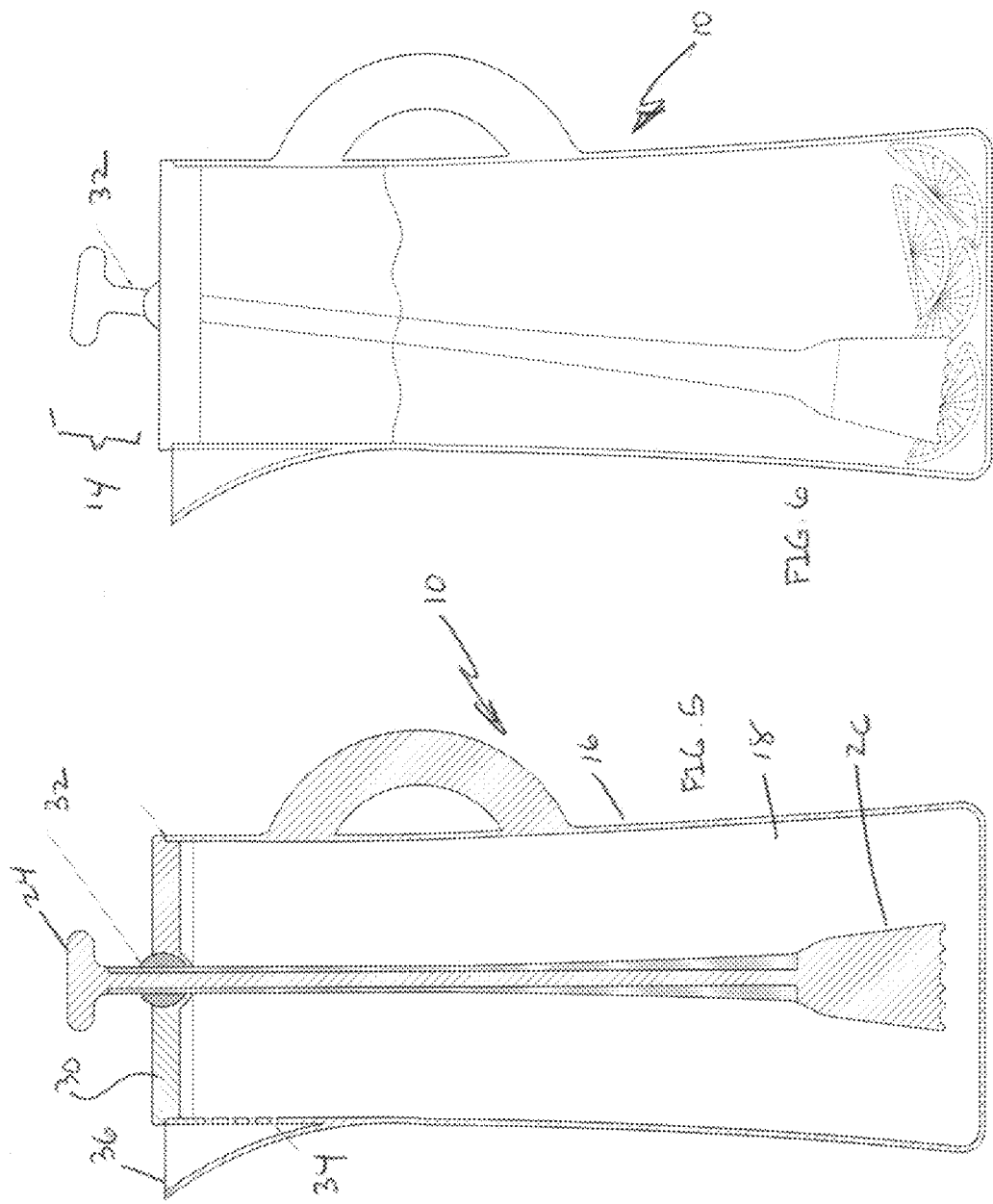

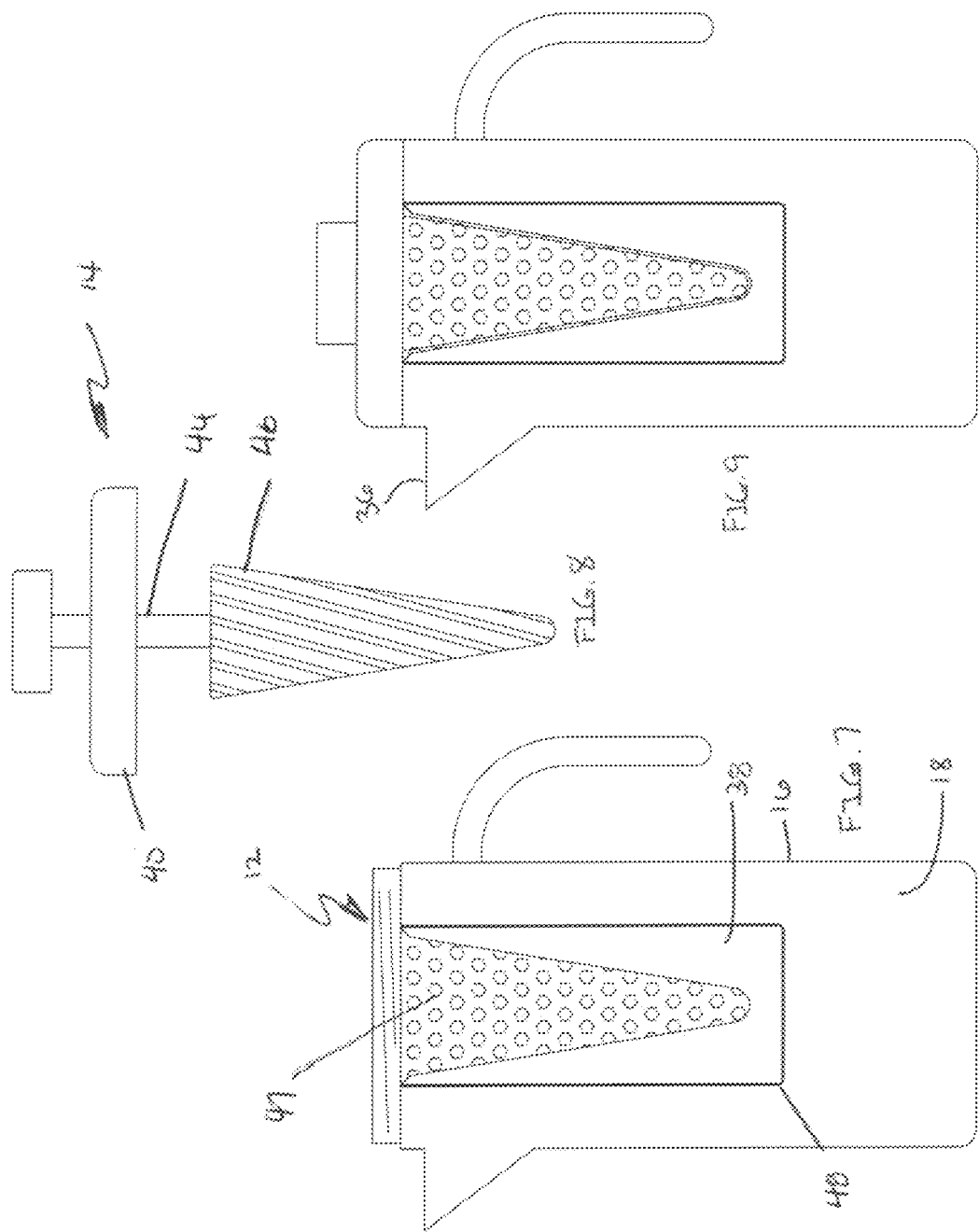

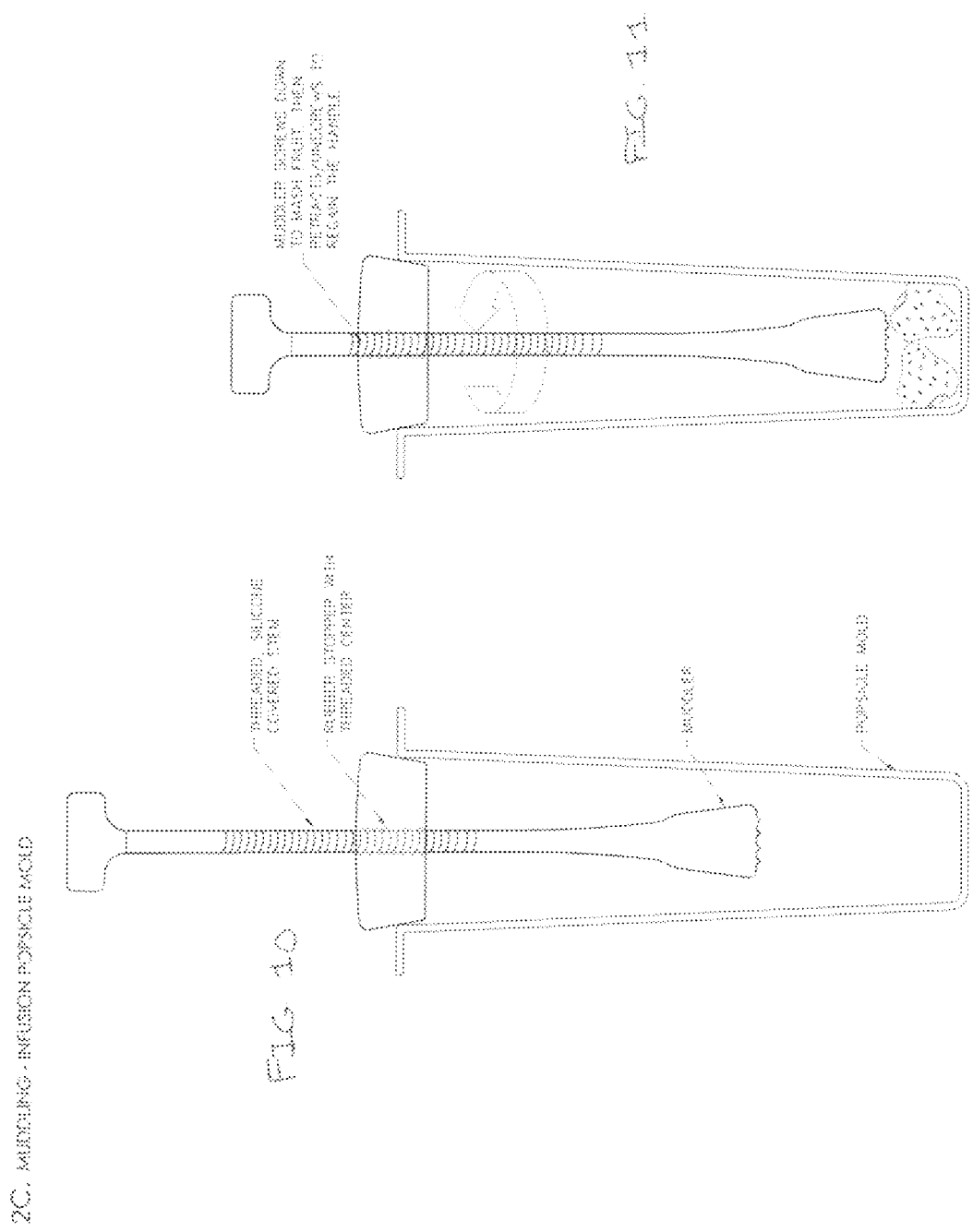

ESSENCE EXTRACTOR

RELATED APPLICATIONS

The present application is a Continuation-in-Part of prior Nonprovisional application Ser. No. 12/961,828, filed Dec. 7, 2010, which is pending. The present application incorporates the subject matter of the copending '828 patent as if it was fully rewritten herein.

BACKGROUND OF THE INVENTION

1. Field of the Invention

The present invention relates generally to an essence extractor for comminuting of foodstuffs for the extraction of edible and aromatic oils and, more particularly, to a portable essence extractor in combination with a liquid container for the direct blending of freshly extracted edible and aromatic oils and such.

2. Description of the Related Art

Hand-held kitchen tools for the comminuting of foodstuffs and the like are well known in the art. Examples include tools for the grinding or mincing of nuts or garlic for use as a component in food preparation. Such devices generally employed squeeze-type implements wherein, through the manipulation of a pair of hinged arms, a plunger engages within a chamber with a perforated bottom to progressively crush a chamber-received clove with the particle and liquid effluent discharging through the perforated bottom of the chamber. In most instances, a major portion of the clove or cloves will remain within the chamber as a pulverized mass which will normally be discarded.

Other hand-held kitchen tools are particularly adapted for beverages, also known as barware. While electric blenders are widely used for both food preparation and beverage preparation, some devices, such as a muddler, are generally known as a bartenders tool used like a pestle to mash, or "muddle", fruits, herbs, and/or spices in the bottom of a glass to release their flavor.

Yet another type of specialty device adapted for beverage creation that can be categorized somewhere between cookware and barware is a French press. Also known as a press pot, coffee press or coffee plunger, a modern French press consists of a narrow cylindrical beaker usually made of glass or clear plastic, equipped with a lid and a plunger, which is made of metal or plastic that fits tightly in the cylinder and has a fine wire or nylon mesh filter. A French press requires coffee of a coarser grind than does a drip brew coffee filter, as finer grounds will seep through the press filter and into the coffee. Coffee is brewed by placing the coffee and water together, stirring it and leaving to brew for a few minutes, then pressing the plunger to trap the coffee grounds at the bottom of the beaker.

As is seen, kitchenware and barware have developed for the specialty comminuting of certain types of foodstuffs for the extraction of edible and aromatic oils for a specific purpose, none have been particularly adapted for essence extraction into aqueous based beverages in a manner that is portable, leak proof and specific for the infusion of the comminuting ingredients. Therefore, a need has been felt for providing an apparatus and method for grinding, muddling and general comminuting of any type of foodstuffs for the extraction of edible and aromatic oils with the purpose of directly blending or combining the freshly extracted edible and aromatic oils and such with a liquid in a sealed leakproof container.

To cope with these problems the present inventor has developed an ingenious way to provide for this as disclosed in those Related Applications. However, the present inventor has continued on his endeavor to improve the comminuting of foodstuffs and has achieved a new way of comminuting any type of foodstuffs for the extraction of edible and aromatic oils with the purpose of directly blending or combining the freshly extracted edible and aromatic oils and such with liquid in a sealed leak proof container.

SUMMARY OF THE INVENTION

It is therefore an object of the present invention to provide a new and improved essence extractor for comminuting of foodstuffs for the infusion of edible and aromatic oils into a liquid in a sealed container.

It is a feature of the present invention to provide a new and improved essence extractor in combination with a liquid container which utilizes a muddling assembly for the direct blending of freshly extracted edible and aromatic oils and such in a manner that creates an infused liquid while allowing the muddling assembly to be in direct fluid communication with the infused liquid when the container is sealed in a leak proof manner.

It is a feature of the present invention to provide a new and improved essence extractor in combination with a liquid container which utilizes a muddling assembly for the direct blending of freshly extracted edible and aromatic oils and such while the container is adapted to allow a strained consumption of the infused liquid.

Briefly described according to one embodiment of the present invention, a portable essence extractor and liquid container combination is provided in which an essence extractor having a muddling assembly is removably connected to, and in fluid communication with, a liquid dispensing container. The essence extractor and muddling assembly comprises an upper handle and a muddling mechanism. The muddling assembly is designed to act as a lid or be incorporated into the lid of the container providing a leak proof and compact container. The muddling assembly further has a separating mechanism for the straining and limiting of the intrusion of pulp or solids into the user's final beverage. The integration of the comminuted ingredients, with the added liquids, encourages the creation of an infused beverage. The liquid container may be formed to allow visual access to the dispensing volume. The liquid container may further be adapted to any number of industrial designs and for various purposes. The container may be used in conjunction with a cooking oil or salad dressing oil and, as such, may be in the form of a carafe so that cooking oils, such as, for example, extra virgin olive oils, can be infused with any various essences and flavors to create flavored cooking oils. The container may also be adapted for use in conjunction with other uses, such as with drinking beverages, condiments, syrups, spirits or the like. The fluid communication between a comminuted ingredients and the liquid volume in the container allows these all natural ingredients to steep directly with the beverage, creating refreshingly flavored drinks.

In any such embodiment modified for a specific end use, the container is operatively connected to an essence extraction assembly such that it removably connects to the liquid dispensing container, as well as in fluid communication with the liquid volume. A separation mechanism, such as a mesh, screen, net, web or other semi permeable barrier is formed between the essence extraction assembly and the user's drink to inhibit the intrusion of "pulp" or solids into the user's drink. Placement of the essence extractor and muddling assembly at the top, bottom, middle, or any specific orientation or configuration should be equivalent, given the fluid communication between the comminuted foodstuff and the liquid volume such that the extraction of edible and aromatic oils can directly blend with any liquid contents of the volume.

In accordance with a preferred embodiment, the essence extractor and muddling assembly will incorporate a linearly adjustable muddling mechanism that can be deployed to lengthen or shorten via a mechanical mechanism that is generally adapted for the extraction of edible and aromatic oils from a broad variety of foodstuffs and is further received in an integrated fashion with a liquid storage vessel. It is anticipated that comminuting can include the blending pulverizing, milling, grinding, fragmentizing, mashing, pulverizing, abraiding, mixing or otherwise reducing the solids of a foodstuff in a manner as to encourage or allow the extraction, mixing, leaching, decoction, elution, or otherwise removal of a targeted edible, flavorful or aromatic constituent.

An advantage of the present invention is that it allows the direct contact of the freshly extracted edible and aromatic oils and such with a target diluent while still allowing the controlled separation or introduction of solids into the final liquid product.

Another advantage of the present invention is that it can be used with a wide variety of target diluents for food, beverage or other gastronomic purposes, from cooking oils such as olive oil, canola oil or the like, to beverages such as water, seltzer, juices or the like.

Further, a preferred embodiment of the present invention is capable of being hand operated, incorporating a muddling assembly that is integrated with a sealing lid. This provides for an adjustable reach of the muddler device, that can expand and/or retract in a linear fashion so as to provide leverage for the user in a muddling capacity within a sealed, leakproof aqueous container.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

FIG. 1 is a side elevational view of a portable essence extractor in combination with a liquid container according to the preferred embodiment of the present invention;

FIG. 2 is a side elevational view of a portable essence extractor with a height-adjustable muddler in combination with a liquid container according to the preferred embodiment of the present invention in which the essence extractor is in a raised position;

FIG. 3 is side elevational view of a portable essence extractor according to the preferred embodiment of the present invention in which the essence extractor is in a retracted position;

FIG. 4 is a top plan view of a portable essence extractor according to the preferred embodiment of the present invention;

FIG. 5 is a side elevational view of portable essence extractor in combination with a liquid container according to one embodiment of the present invention;

FIG. 6 is a side elevational view of a portable essence extractor in combination with a liquid container according to the embodiment of FIG. 5;

FIG. 7 is a side elevational view of a portable essence extractor in combination with a liquid container according to one embodiment of the present invention;

FIG. 8 is a side elevational view of a portable essence extractor in combination with a liquid container according to the embodiment of FIG. 7;

FIG. 9 top plan view of a portable essence extractor according to the embodiment of FIG. 7;

FIG. 10 is a cross sectional side elevational view of a portable essence extractor in combination with a liquid container according to a second alternate embodiment of the present invention in the form of an infusion ice mold; and FIG. 11 is a cross sectional side elevational view of the alternate embodiment shown in FIG. 10 shown in operation.

DESCRIPTION OF THE PREFERRED EMBODIMENTS

The best mode for carrying out the invention is presented in terms of its preferred embodiment, herein depicted within the Figures. As used in this application, the term "muddler" or "muddler element" refers not just to a bartenders tool used, but should be construed broadly in order to include pestles, etc. or any physical structure actually used in tituration or to mash, crush, grind, mix, squeeze or otherwise release flavors from fruits, herbs, and/or spices in a manner that provides added leverage to the user in accomplishing these functions. A "muddling assembly", as used in this application, refers broadly to those structures as described that incorporates a muddler element in conjunction with other functional structures.

1. Detailed Description of the Figures

Referring now to FIG. 1, a portable essence extractor and liquid container combination, generally noted as 10, is shown according to the preferred embodiment of the present invention incorporating an essence extractor 12 having a muddling assembly 14 that removably connects to a liquid dispensing container 16. The essence extractor 12 may be integrated directly with or form a structure that creates a cover or lid for the dispensing container 16, and is further in fluid communication with the storage and dispensing volume 18 formed by the outer sidewalls 20 of the liquid container 16.

The liquid container 16 is anticipated as being formed of stainless steel, or a clear or translucent material to allow visual access to the dispensing volume 18. The container 16 itself may be adapted to any number of industrial designs and for various purposes. By way of example, the preferred embodiment is a liquid container designed as a pitcher for storing and dispensing liquids. As an example, and not meant as a limitation, cooking oils, such as, for example, extra virgin olive oils, can be infused with any various essences and flavors to create flavored cooking oils. However, the container 16 may also be adapted for use in conjunction with other uses, such as with drinking beverages, condiments, syrups, or the like, or with mixing and infusing beauty products, and as such the adaptation of the container 16 is intended to be broadly construed in light of the other features, functions and intended uses of the present invention.

By way of example, and not as a limitation, FIG. 1-4 depicts the container 16 adapted as a pitcher vessel, in which the pitcher vessel has an upper opening 22 for receiving the essence extractor 12 and muddling assembly 14. The muddling assembly 14 has a handle 24 allowing a user to manipulate the muddling assembly 14. The handle 24 may incorporate an adjustment mechanism, such as telescoping elements that allow the user to adjust the overall length of a muddling mechanism 26. It would be obvious to a person having ordinary skill in the relevant art, in light of the present teachings, that the method and manner of allowing for the adjustment of the linear length of the muddling mechanism 26 would not be limiting to the present invention, and that any mechanical elements that would allow for the muddling mechanism 26 to be adjusted relative to contents of the container 16 should be considered equivalent. By way of example, and not as a limitation, the muddling mechanism 26 can be formed in a telescopic manner to lengthen or retract the muddling mechanism to facilitate easier usage. As such, the muddling mechanism 21 may be lengthened or retracted by releasing or tightening the quick release mechanism 27, depending on if the user desires to extend or retract the muddling mechanism 26.

The muddling mechanism 26 provides for the direct muddling or blending of freshly extracted edible and aromatic oils and such. The handle 24 can be made of rubber or the like allowing the handle to seal the pitcher vessel and act as a lid. The handle 24 acts as a lid in a plugging or sealing manner and is removably received by the upper opening 22 of the pitcher vessel. The upper opening 22 forms a spout 28 to allow the infused liquid to be dispensed while at the same time preventing the transmission or migration of retained comminuted foodstuff solids when the muddling assembly 14 is maneuvered to allow a small opening in which the infused liquid can pass through. Further, the muddling mechanism can incorporate spikes, blades, or the like to aid in the muddling of foodstuffs. In this manner, a drinking beverage contained therein can be infused with the essences from ground or comminuted fruit, vegetables, nuts, herbs, or any other type of ingredient and shaken without leaking from the container.

The fluid communication between the comminuting volume of the essence extractor 12 and muddling assembly 14 and the container 16 allows these all natural ingredients to steep directly with the beverage, creating refreshingly flavored drinks. It is anticipated that a number of beverage options can exist, such as water, tea, vodka or other spirits. Given this broad anticipation of functionality, it should be obvious to a person having ordinary skill in the relevant art to find that adaptations or changes to the form or particular intended use of the container 16 would be equivalent to the present invention, or merely a design choice or alteration, or both.

According to one embodiment of the present invention, as shown in conjunction with FIG. 5-6, the liquid container 16 is shown adapted for use as an infusion pitcher container that is operatively connected to the essence extractor 12 and muddling assembly 14 such that it removably connects to the liquid dispensing container 16, as well as being in fluid communication with the liquid volume 18 when connected while providing a leak proof container. In this embodiment, the infusion pitcher container has an upper lid 30. The essence extractor 12 and muddling assembly 14 can be integrally affixed to and within the upper lid 30. The muddling assembly 14 further comprises a handle 24, a muddling mechanism 26 and a joint mechanism 32 for allowing the muddling assembly 14 to rotate freely in a 360 degree range of motion (i.e. capable of motion around an indefinite number of axes) while allowing the muddling mechanism 26 to be raised and lowered in a perpendicular direction relative to the upper lid 30. It is envisioned that the joint mechanism 32 can be a ball and socket type joint or the like. The infusion pitcher container has a perforated opening 34 allowing the infused liquid to be dispensed while at the same time preventing the transmission or migration of retained comminuted foodstuff solids from the liquid container 16. The infusion pitcher container has a pouring spout 36 to aid the user in dispensing the infused liquid from the liquid container 16.

According to another embodiment of the present invention as shown in conjunction with FIG. 7-9, the liquid container 16 is shown adapted for use as an infusion pitcher container that is operatively connected to the essence extractor 12 and muddling assembly 14 such that it removably connects to the liquid dispensing container 16, as well as being in fluid communication with the liquid volume 18 when connected while providing a leak proof container. In this embodiment, the liquid container 16 incorporates a muddling compartment 38 for the direct muddling or blending of freshly extracted edible and aromatic oils and such. The muddling compartment 38 can be placed anywhere within the liquid container 16 such as the bottom, middle, or top of the liquid container 16. In this embodiment, the essence extractor 12 and muddling assembly 14 comprise a closing cap 40 for sealing the liquid container 16 as well as aiding in muddling of the desired foodstuffs. The closing cap 40 has an adjustment mechanism 42 which operates in conjunction with an adjustable means of a spring loaded or screw mechanism 44 to provide for different sizes of foodstuffs. The essence extractor 12 and muddling assembly 14 further comprise a conical fluted muddler 46 for muddling or blending in conjunction with a grating surface 47 to aid in slicing, grating, chopping, pulverizing or otherwise comminuting of the foodstuff from which extraction is desired. The essence extractor 12 and muddling assembly 14 also has a separation mechanism 48 between the essence extractor 12 in combination with the muddling assembly 14 and the liquid dispensing container 16 where the separation mechanism 48, such as an infusion screen, that is adapted to obstruct communication of solids while permitting fluid communication of the infused liquid for a strained consumption by a user. The separation mechanism 48 can be a metal or plastic filter, screen or the like having a porosity that corresponds to the amount of communication of any solids that the user desires. In this embodiment, the liquid container 16 also has a pouring spout 36 to aid in dispensing of the infused liquid. While the embodiments presented herein are shown anticipated the use of a muddling assembly 14 affixing to or received by the liquid container 16, such embodiments were selected as preferred design choices that enable the present invention, but were not intended as being strict limitations. Placement of the essence extractor 12 and muddling assembly 14 at the top, bottom, middle, or any specific orientation or configuration should be equivalent, given the fluid communication between the comminuted foodstuff and the liquid volume 18 such that the extraction of edible and aromatic oils can directly blend with any liquid contents of the volume 18.

While such configurations of the present invention are designed to be capable of being manually operated in an extendable/retractable manner, it is anticipated that the use of other mechanical means to create an extension or retraction of the muddler mechanism would be equivalent to or an obvious extension of the teachings herein, such as, for example, through spring loaded extension, retractable plungers, compression lock and release mechanisms, twist down screw concepts and frictional stop mechanisms. It is further understood by those having ordinary skill in the relevant art that the technology for muddling foodstuffs has existed as far back as the use of grinding food between two rocks by early homo sapiens. As such, it should be apparent that only those that can accommodate the direct fluid communication of liquid with comminuted foodstuffs while in a compact, leak proof container are capable of being adapted for use with the present invention.

2. Operation of the Preferred Embodiment

In accordance with a preferred embodiment of the present invention, as shown in FIG. 1-4, the operation of the present invention is shown in which foodstuffs, such as fruit, vegetables, herbs, nuts or the like, are placed in the liquid container and the muddling assembly is used to muddle, smash or press the foodstuffs against the bottom of the container or within a compartment within the container. The muddling assembly is adapted to provide a leak proof seal and can be maneuvered to allow the infused liquid to be dispensed while preventing the communication of solids from also being dispensed. The muddling mechanism can be lengthened or shortened by way of the use of a quick release mechanism that compresses or releases the muddling mechanism to correspond to the size of the available container volume, as well as shorten when no muddling is desired. The user is now able to grind fruit, vegetables, nuts, herbs, or anything desired foodstuff directly into the target diluent, such as a cooking oil, condiment syrup, spirits or beverage. This direct contact allowing the all natural ingredients to steep directly into the diluent creates refreshingly flavored drinks, condiments or cooking oils and directly capturing nutrients or edible or aromatic extracts. The infused liquid can be consumed or used directly or indirectly from the container, and can be refrigerated after mixing. When emptied, the old ingredient can be discarded and the assembly components washed in preparation for reuse.

In accordance with another embodiment of the present invention, an essence extractor and muddling assembly is generally adapted for the extraction of edible and aromatic oils from a broad variety of foodstuffs and is further received in an integrated fashion with a liquid storage vessel. One general advantage of the present invention is that it allows the direct blending for freshly extracted edible and aromatic oils and such with a target diluent while providing a strained consumption of the infused liquid. In this embodiment, as shown in FIG. 5-6, the muddling assembly can freely rotate in any direction and can be directed to muddle any foodstuffs placed within the container. As such, it is anticipated that various modifications may be made to allow for the muddling, blending, combining or comminuting of foodstuffs in specifically adapted configurations to allow the infusion of essences released from the comminuted materials into an edible solvent. By way of example, and not meant to be limiting, other embodiments according to the present invention are depicted in FIG. 7-9 in which a liquid dispensing pitcher is provided incorporating the features and functions of the present invention. A muddling compartment is centrally located within the pitcher and is anularly surrounded by, and in fluid communication with, the fluid within the container. In this embodiment, the foodstuffs are placed on the removable auger. The adjustment plate is configured to correspond to the size of the particular foodstuff being muddled or blended. The closing cap is then placed over the foodstuff and twisted to muddle or blend the foodstuff releasing the edible and aromatic essential oils and the separating mechanism prevents the solids from migrating into the outputted liquid beverage while allowing the fluid communication of the edible and aromatic oils creating an infused liquid ready for strained consumption.

By way of another example, and again not meant to be limiting, other alternate embodiment according to the present invention is depicted in FIG. 10-11 in which a fluid container in the form of an infusion ice mold 50 is provided incorporating the features and functions of the present invention. The ice mold 50 is provided for the creation of frozen liquid foodstuffs, and further forms the muddling compartment itself. In this embodiment, the foodstuffs are placed within the bottom of the mold 50, and a sealing lid 52 forming a closing cap to be placed over the ice mold 50 after foodstuff is placed within. By twisting the muddle, the foodstuff is mashed, thereby releasing the edible and aromatic essential oils into which a liquid can be added prior to placement into a freezer to create an infused, molded frozen liquid ready for consumption.

The foregoing descriptions of specific multiple embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents. Therefore, the scope of the invention is to be limited only by the following claims.

Having thus described the invention what is claimed as new and desired to be secured by Letters Patent is as follows:

1. An essence extraction device for comminuting of foodstuffs for the extraction and infusion of edible and aromatic oils comprising:
   an essence extractor having a muddling assembly comprising a handle and muddling mechanism; and
   a liquid dispensing container that is removably connected to said essence extractor and receiving said muddling assembly, said liquid dispensing container further forming a storage and dispensing fluid volume in fluid communication with said essence extractor such that the direct blending of freshly extracted edible and aromatic oils is available;
wherein said muddling assembly further comprises an upper lid in which said muddling assembly is integrally affixed thereto, and further comprising:
   a quick release mechanism for allowing said muddling mechanism to expand or retract in length to providing leverage for a user function;
   a perforated opening for limiting the communication of solids from the dispensing volume while allowing a strained consumption of said dispensing volume by a user; and
   a pouring spout to aid in dispensing of said dispensing volume.

2. The essence extractor and liquid container combination of claim 1, wherein said dispensing container further allows visual access to the dispensing volume.

3. The essence extractor and liquid container combination of claim 1, wherein said container is operatively connected to said essence extractor such that said essence extractor removably connects to the liquid dispensing container, as well as being in continuous fluid communication with the liquid volume.

4. The essence extractor and liquid container combination of claim 1, wherein said essence extractor is adapted for comminuting a foodstuff for mixing into a liquid via a mechanism selected from the group consisting of: grinding; muddling; blending; and pulverizing.

5. The essence extractor and liquid container combination of claim 1, wherein said muddling mechanism comprises a blunted distal end, opposite said handle, said distal end adapted for use in crushing, grinding or comminuting of foodstuffs.

6. The essence extractor and liquid container combination of claim 5, further comprising at least one protuberance, blade or detende to aid in the muddling of foodstuffs.

7. The essence extractor and liquid container combination of claim 1, wherein said muddling assembly further comprises a closing cover for said liquid dispensing container.

8. An essence extraction device for comminuting of foodstuffs for the extraction and infusion of edible and aromatic oils comprising:
   an essence extractor having a muddling assembly comprising a handle and muddling mechanism; and
   a liquid dispensing container that is removably connected to said essence extractor and receiving said muddling assembly, said liquid dispensing container further forming a storage and dispensing fluid volume in fluid communication with said essence extractor such that the direct blending of freshly extracted edible and aromatic oils is available;
wherein said muddling assembly further comprises a linear adjustment mechanism for affixing said handle and said muddling mechanism in a linearly variable manner.

9. An essence extractor for comminuting of foodstuffs for the extraction and infusion of edible and aromatic oils comprising:
   an essence extractor having an integrated muddling assembly for the direct muddling or blending of foodstuffs in combination with a sealing lid;
   a muddling compartment to receive said foodstuffs;
   an adjustment mechanism for providing adjustable muddling to provide leverage for a user function; and
   a separation mechanism adapted to obstruct communication of solids while permitting fluid communication of a dispensing volume of said container.

10. The essence extractor and liquid container combination of claim 9, wherein said muddling compartment is positioned relative to said liquid dispensing container from an orientation selected from the group consisting of: above; below; or within.

11. The essence extractor and liquid container combination of claim 9, wherein said separation mechanism has a permeability selected for permitting a desired barrier to the communication of solids into a user's dispensed drink.

12. The essence extractor of claim 9, wherein said adjustment mechanism comprises a linear adjustment mechanism for affixing said handle and said muddling mechanism in a linearly variable manner.

13. A method of blending freshly extracted edible and aromatic oils with an edible diluent liquid comprising:
   containing selected comminuting foodstuffs in an essence extractor having a muddling assembly of claim 1;
   placing said essence extractor and muddling assembly in fluid communication with a liquid dispenser forming a storage and dispensing fluid volume;
   comminuting said foodstuffs for the extraction of edible and aromatic oils such that the direct blending of extracted edible and aromatic oils are mixed with a diluent liquid contained within said storage and dispensing volume; and
   dispensing a liquid beverage containing an extracted essence from said liquid dispenser in a manner that limits the communication of solids from said liquid dispenser while allowing a strained consumption of said dispensing volume by a user.

14. The method of claim 13, wherein said liquid container and said essence extractor are capable of being connected in a leak proof manner.

15. The method of claim 14, wherein said container is adapted for specific use with a pitcher vessel; wherein said liquid can be infused with any various essences and flavors to create flavored drinks.

16. An essence extraction device for comminuting of foodstuffs for the extraction and infusion of edible and aromatic oils comprising:
   an essence extracting and telescoping muddling assembly;
   a liquid dispensing container having a storage volume and having an upper opening; and
   said telescoping muddling assembly removably connected at said upper opening;
wherein said muddling assembly is telescoped outward in order to provide leveraged access to a bottom of said storage volume, and said muddling assembly is telescoped inward for storage within said storage volume.

17. The essence extraction device of claim 16, wherein said muddling assembly further comprises:
   an upper handle; and
   a sealing connection between said upper handle and said telescoping muddling assembly, wherein said sealing connection forms a mechanism that both connects to said upper opening and seals said storage volume.

18. The essence extraction device of claim 17, further comprising a separation mechanism adapted to obstruct communication of solids while permitting fluid communication from said storage volume of said container.

19. The essence extraction device of claim 17, wherein said sealing connection further allows for a 360° rotation of said muddling assembly within said storage volume or 360° rotation of said separation mechanism such that straining may be completed without interference by said muddling assembly.

20. The essence extraction device of claim 16, wherein said telescoping muddling assembly further comprises an adjustment mechanism for temporarily fixing an adjustable length of said muddling assembly.

* * * * *